(12) United States Patent
Edwards et al.

(10) Patent No.: US 7,793,618 B2
(45) Date of Patent: Sep. 14, 2010

(54) DUAL-PURPOSE PACKAGING FOR A PET-RELATED PRODUCT, AND RELATED PROCESS

(76) Inventors: Shaun Edwards, 601 Hoska Dr., Del Mar, CA (US) 92014; Timothy Edwards, 601 Hoska Dr., Del Mar, CA (US) 92014

( * ) Notice: Subject to any disclaimer, the term of this patent is extended or adjusted under 35 U.S.C. 154(b) by 63 days.

(21) Appl. No.: 12/110,993

(22) Filed: Apr. 28, 2008

(65) Prior Publication Data
US 2009/0266306 A1    Oct. 29, 2009

(51) Int. Cl.
*A01K 15/02*   (2006.01)
*A01K 29/00*   (2006.01)
*B67D 1/00*    (2006.01)
*A63H 5/00*    (2006.01)

(52) U.S. Cl. .................. 119/709; 119/702; 222/39; 446/81

(58) Field of Classification Search .......... 119/702, 119/703, 704, 705, 706, 707, 708, 709, 710, 119/711; 222/39, 42, 78; 446/75, 76, 77, 446/81
See application file for complete search history.

(56) References Cited

U.S. PATENT DOCUMENTS

| | | | |
|---|---|---|---|
| 3,521,397 A * | 7/1970 | Meates ................ 446/74 |
| 4,183,328 A | 1/1980 | Lawrence | |
| 5,842,618 A * | 12/1998 | Julemont et al. ........... 222/490 |
| 6,296,540 B1 * | 10/2001 | LaPlaca et al. .............. 446/75 |
| 6,315,163 B1 * | 11/2001 | Shu .............................. 222/39 |
| 6,557,494 B2 | 5/2003 | Pontes | |
| 6,663,457 B2 | 12/2003 | Ritchey | |
| 6,918,355 B1 | 7/2005 | Arvanites | |
| 2002/0073927 A1 | 6/2002 | Chamberlain | |
| 2002/0134318 A1 * | 9/2002 | Mann et al. ................ 119/709 |
| 2005/0115517 A1 | 6/2005 | Wolfe, Jr. et al. | |

* cited by examiner

*Primary Examiner*—Michael R Mansen
*Assistant Examiner*—Monica Williams
(74) *Attorney, Agent, or Firm*—Kelly Lowry & Kelley, LLP

(57) ABSTRACT

A dual-purpose packaging for a pet-related product includes a flexible, non-toxic and bite-resistant enclosure filled with a pet-related product. The enclosure includes a retractable valve for selectively dispensing the pet-related product from within the enclosure. The packaging may further include a set of squeak elements associated with a corresponding set of air-filled chambers coupled to the enclosure. Accordingly, the enclosure may be reutilized as a pet chew toy once the pet-related product is substantially dispensed from within the enclosure.

17 Claims, 4 Drawing Sheets

DUAL-PURPOSE PACKAGING FOR A PET-RELATED PRODUCT, AND RELATED PROCESS

BACKGROUND OF THE INVENTION

The invention generally relates to dual-purpose packaging. More particularly, the present invention relates to dual-purpose packaging that extends the utility of the packaging as a container for a pet-related product and chew toy.

Single use containers for retaining liquids are generally known in the art. Such containers may include hard outer shells where pressurized liquid is dispensed by a pressure release valve. Alternatively, the containers may include a generally flexible outer wall that is squeezable to remove controlled amounts of this liquid from within the container. The flexible wall containers are generally formed of an elongated tube structure having a hole formed therein to release the liquid. Consumers purchase replacement containers when the contents of the original container are fully dispensed. Thereafter the original container is typically placed in the garbage.

Pet toys are also generally known in the art and are also generally packaged in single use disposable containers. In some instances, the pet toys contain little or no packaging at all. These pet toys are typically formed from a variety of materials that might include plastic or rubber and have generally durable outer materials that are suitable, in themselves, as packaging. Some of these pet toys are designed to entertain pets and may contain attractive scents or treats (e.g., catnip, doggy treats, or other food or aromatic substances that stimulate play). Often these additives are retained within a container formed as part of the pet toy. But, some filled pet toys are permanently sealed. Inaccessible materials such as catnip or potpourri may expire or become stale and thereafter the pet toy itself must be thrown away and replaced.

Alternatively, other self-packaged pet toys provide access to the filler retained within the container. Access to the filler is provided by a closure device such as a zipper, valve, snap, button, or other device known in the art. These closure devices can be asymmetrical or bulky. In many pet toys, the closure device is physically exposed and easily manipulated by the pet during use. Inadvertent opening or breakage of the closure device easily results from gnawing or other types of scratching or rubbing during use of the pet toy. Inadvertently opening the closure device will expose any filler material or other contents. Loss of the filler may provide health risks to the pet or others playing with the pet toy. Additionally, exposed closure device parts may cause tooth chipping should the pet bite down hard thereon.

Other pet toys known in the art have hollow centers. These pet toys have an air escape passage and create noise when the toy is chewed by the pet. Again, these pet toys are usually sold in a one-time use disposable package.

A chewable pet toy requires durable materials for long term use, as continual use eventually wears out the outer material. The pet toy requires replacement once the outer material wears out. Any filler will tend to leak or spill from within the pet toy when the outer material wears out. The very purpose of retaining the filler within the pet toy is therefore lost. Wear and tear on the outer material may not only lead to quick replacement, but could also cause injury, such as choking, especially as the pet toy disintegrates and parts fall off.

Accordingly, there is a need for a dual-purpose package for a pet that is flexible, non-toxic and bite-resistant. Such a dual-purpose package should include a fluid enclosure that is capable of retaining a pet-related product. The dual-purpose package should also include a means for dispensing and refilling the enclosure with a pet-related product or other liquid. The packaging should be durable enough such that the enclosure may be reutilized as a pet chew toy once the pet-related product is substantially dispensed from the enclosure. The present invention fulfills these needs and provides other related advantages.

SUMMARY OF THE INVENTION

A dual-purpose packaging for a pet-related product is provided. The dual-purpose packaging has a flexible, non-toxic and bite-resistant enclosure filled with a pet-related product. Furthermore, the dual-purpose packaging has a means for selectively dispensing the pet-related product from within the enclosure. Dispensing of the pet-related product is regulated by an extendable and retractable valve that includes a cap/plug integrated therein for retaining the pet-related product within the enclosure. The valve may have a squeak element coupled therein. The present invention also includes a means for selectively refilling the enclosure, if desired. In this embodiment, the enclosure may be reutilized as a pet chew toy once the pet-related product is substantially dispensed from within the enclosure. The squeak element may, alternatively, be integrated into a separate air-filled chamber. The dual-purpose packaging of the present invention may comprise multiple air-filled chambers having multiple squeak elements therein.

In another aspect of the present invention, the dual-purpose packaging includes a process for extending the utility of the packaging as a pet-related product. This process includes the steps of filling a flexible, non-toxic and bite-resistant enclosure with a pet-related product. The pet-related product is then selectively dispensed from the enclosure for use in association with the pet. The process could further include the step of selectively refilling the enclosure with shampoo or another fluid, if desired. The utility of the packaging is thereafter extended by utilizing the enclosure as a pet chew toy.

In an alternative embodiment, the dual-purpose package is capable of dispensing the pet-related product from within the enclosure through a selectively retractable valve. This retractable valve is accordingly concealable within the enclosure after the dispensing step.

The method of manufacturing the dual-purpose packaging of the present invention includes the step of blow molding a flexible, non-toxic and bite-resistant enclosure. A selectively retractable valve is then integrated into the enclosure. The valve may include a squeak element therein. The enclosure is then filled with a pet-related product and sealed for use. Alternatively, the dual-purpose packaging includes multiple air-filled chambers glued to the enclosure. Each air-filled chamber may have a squeak element therein.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figures 1, 2:
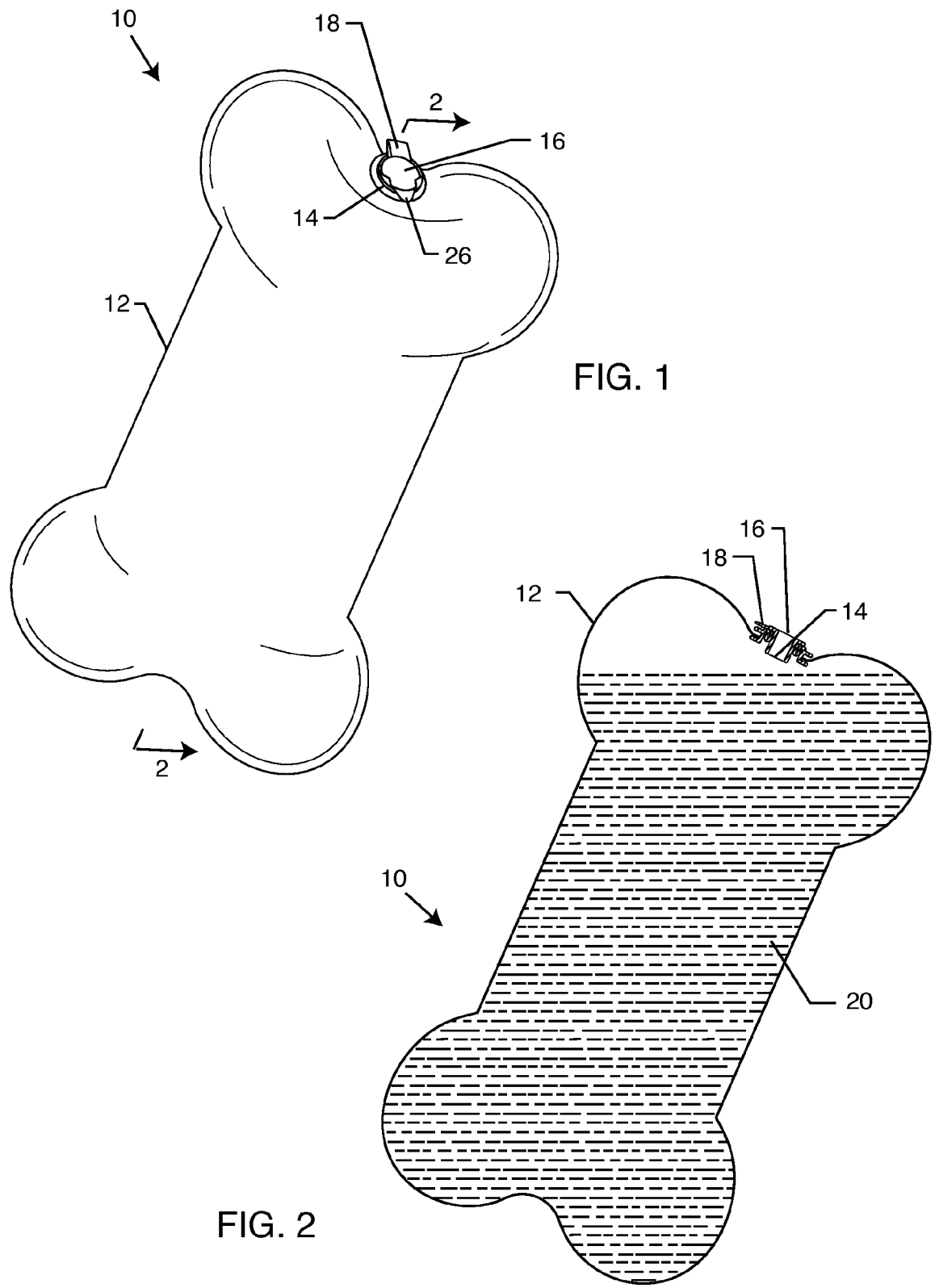
FIG. 1 illustrates a perspective view of a dual-purpose package of the present invention having a valve incorporated therein at one end.
FIG. 2 is a cross-sectional view taken generally along the line 2-2, of FIG. 1.

As shown in the exemplary drawings for purposes of illustration, the present invention for a dual-purpose package is referenced to generally by the reference numeral 10. Turning now to the representative figures in the specification, FIG. 1 illustrates the dual-purpose package 10 having a receptacle 12 and a valve 14. As best shown in FIG. 1, the valve 14 also incorporates a valve cap 16 and a corresponding strap 18. The receptacle 12 of the dual-purpose package 10 is generally constructed from a tough and durable material that extends the reusable life of the dual-purpose package 10. The dual-purpose package 10 must be able to withstand pet biting, gnawing, rubbing, chewing, scratching, or any other use by a pet. Preferably, the dual-purpose package 10 is manufactured via blow molding and does not contain a seam. Accordingly, the dual-purpose package 10 does not deflate after dispensing the liquid therein. Rather, the dual-purpose package 10 maintains a substantially rigid, yet deformable, structure. The embodiment shown in FIG. 1 illustrates the dual-purpose package 10 as filled with a liquid 20. The structure is deformable to dispense the contents therein, such as the liquid 20.

The liquid 20 is further shown in the cross-sectional view in FIG. 2 and may initially include shampoo. Once the shampoo is completely dispensed, the liquid 20 may be refilled with a variety of liquids including water, air, shampoo, or another liquid known in the art suitable for use with a pet (e.g., dog, cat, etc.). But, the dual-purpose package 10 is preferably not refilled. The liquid 20 is dispensed and refilled through the valve 14.

FIGS. 1-2 illustrate the valve 14 in a collapsed position. In these embodiments, a top neck 22 and a bottom neck portion 24 (best shown in FIGS. 3-4) are located substantially within the interior of the receptacle 12 of the dual-purpose package 10. Here the valve 14 and cap 16 are substantially sheltered from any interference with the pet. Inadvertent dislodgement of the valve cap 16 from within the top neck 22 is therefore avoided. Additionally, the pet will have difficulty chipping teeth or otherwise incurring a bodily injury because the valve 14 is inaccessible. The liquid 20 is therefore safely retained within the receptacle 12 of the dual-purpose package 10.

Figure 3:
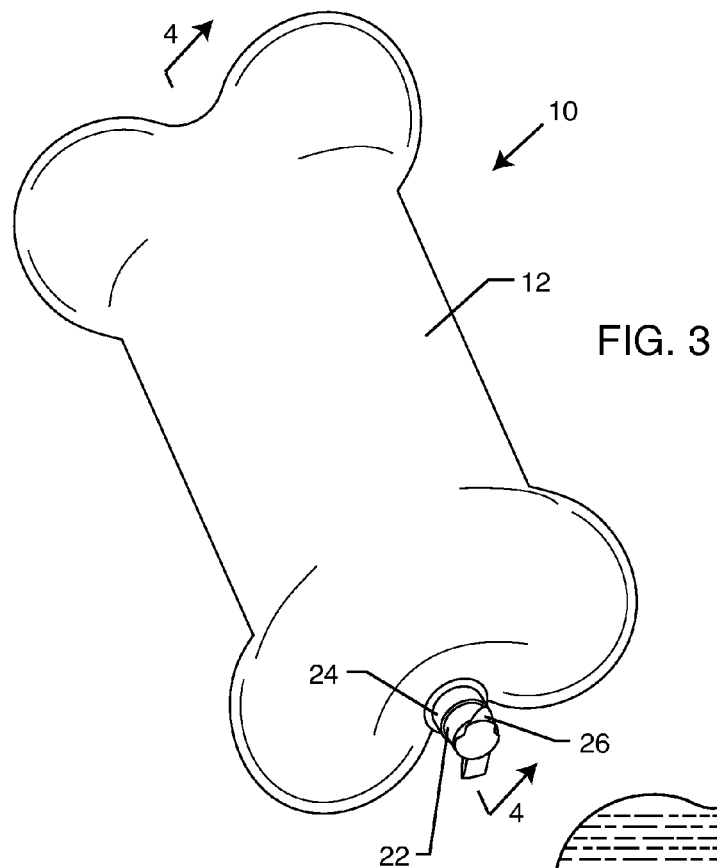
FIG. 3 is a perspective view of the dual-purpose package, wherein the valve is extended.
Figure 4:
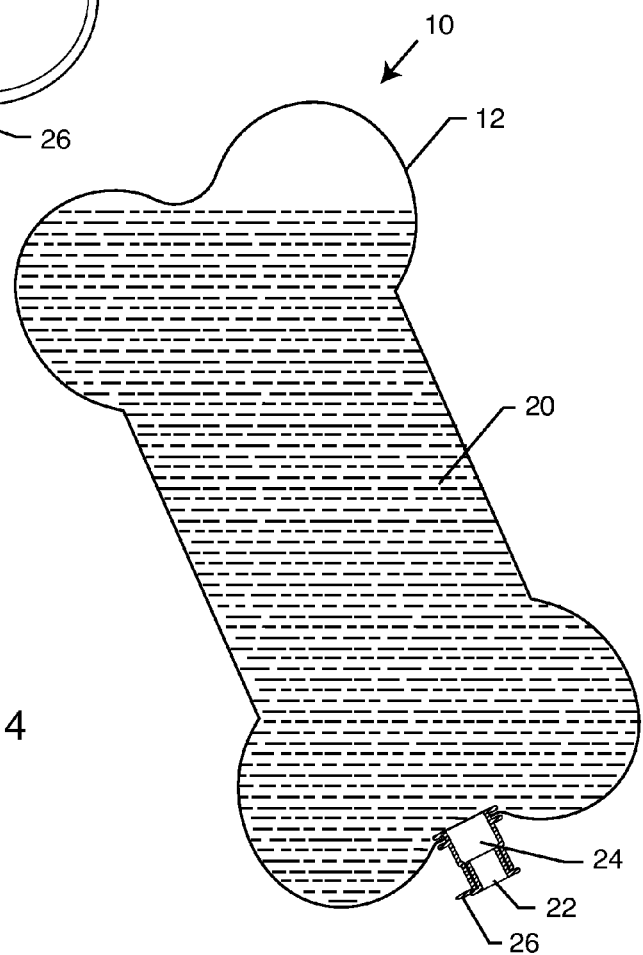
FIG. 4 is a cross-sectional view taken generally along the line 4-4, of FIG. 3.
Figure 5:
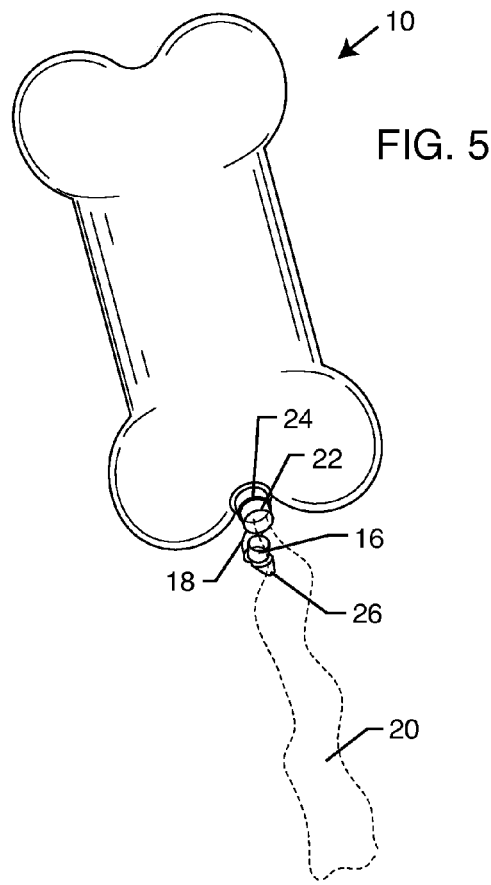
FIG. 5 illustrates removal of the liquid contents from within the dual-purpose package.

To facilitate dispensing of the liquid 20 from the interior of the receptacle 12, the top neck 22 and the bottom neck 24 of the valve 14 are pulled out from within the interior of the receptacle 12 to the extended position as shown in FIGS. 3-4. Much like a beach ball valve, the top neck 22 and the bottom neck 24 no longer reside flush with the receptacle 12 in this extended position. A tab 26 integral to the valve cap 16 is now accessible for fingertip engagement. Applying a force to the bottom side of the tab 26, opposite to the strap 18, pushes the valve cap 16 from within the interior of the top neck 22. FIG. 5 best illustrates the valve 14 as opened and dispensing the liquid 20.

Figure 6:
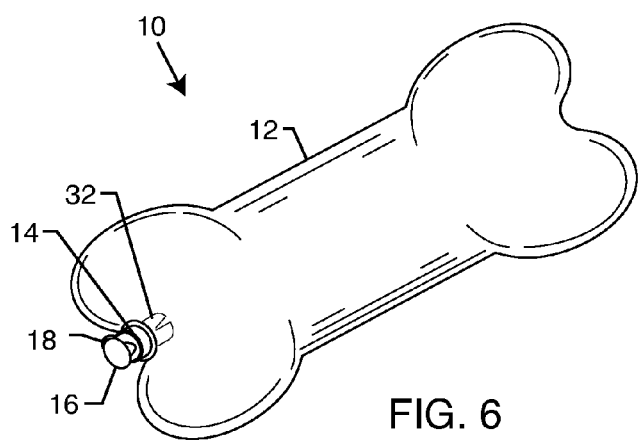
FIG. 6 is a perspective view of the dual-purpose package integrating a combined valve and squeak element.

When the valve 14 is open, as shown in FIG. 5, the liquid 20 is capable of being dispensed by squeezing the exterior of the receptacle 12. The liquid 20 may also be inserted into the receptacle 12 through the top neck 22 and the bottom neck 24. FIG. 6 further discloses the dual-purpose package 10 of the present invention after the liquid 20 is fully dispensed from within the receptacle 12. As shown in FIG. 6, the dual-purpose package 10 retains its shape after the liquid 20 is fully dispensed therefrom. In this embodiment, a dog 28 (FIG. 7) uses the dual-purpose package 10 as a toy rather than a liquid product container. Alternatively, the receptacle 12 is refillable with more of the liquid 20 for further use as a shampoo dispenser or other container. Moreover, the shape of the dual-purpose package 10 could include a dog bone (as shown in FIGS. 1-7) or any other suitable configuration for retaining shampoo or any other liquid known in the art and compatible for use with a pet, such as a snowman (FIG. 8) or star configuration (FIG. 9).

Figure 7:
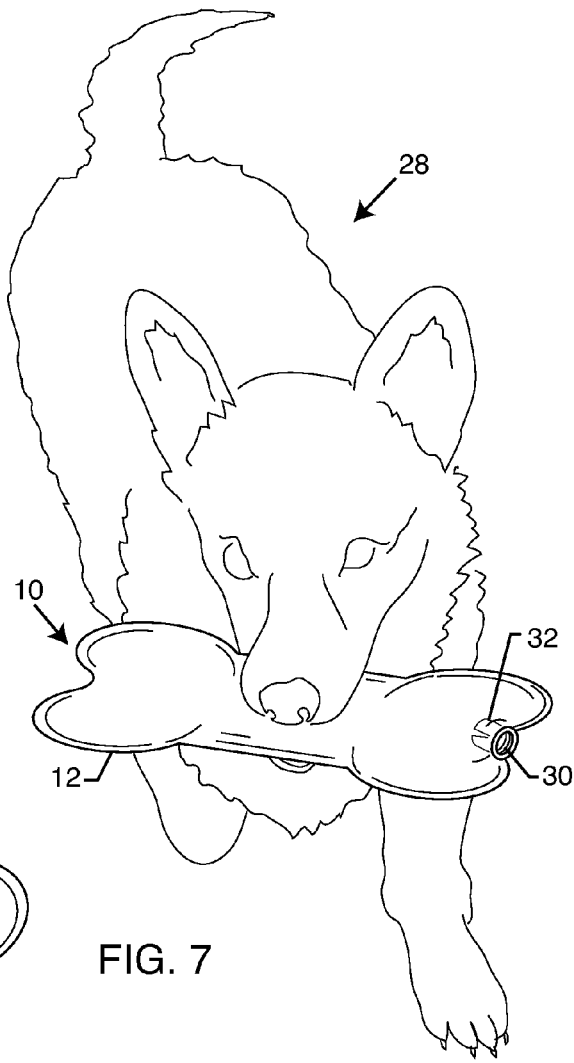
FIG. 7 is a perspective view of the dual-purpose package of the present invention in use with a dog.

FIG. 6 further illustrates the valve 14 screwingly engaged to the receptacle 12 via a valve mount 30. In this embodiment, the valve 14, the corresponding valve cap 16 and the strap 18 may be removed from the dual-purpose package 10 altogether, as shown in FIG. 7. In FIG. 7, the valve 14 is removed to expose a squeak element 32 disposed within the interior of the receptacle 12. When the liquid 20 is completely dispensed from the receptacle 12, as shown in FIGS. 6 and 7, the dual-purpose package 10 of the present invention functions as a squeak toy. Thus, when the dog 28 in FIG. 7 bites the exterior of the receptacle 12 as shown, the squeak element 32 within the receptacle 12 makes a noise.

Figure 8:
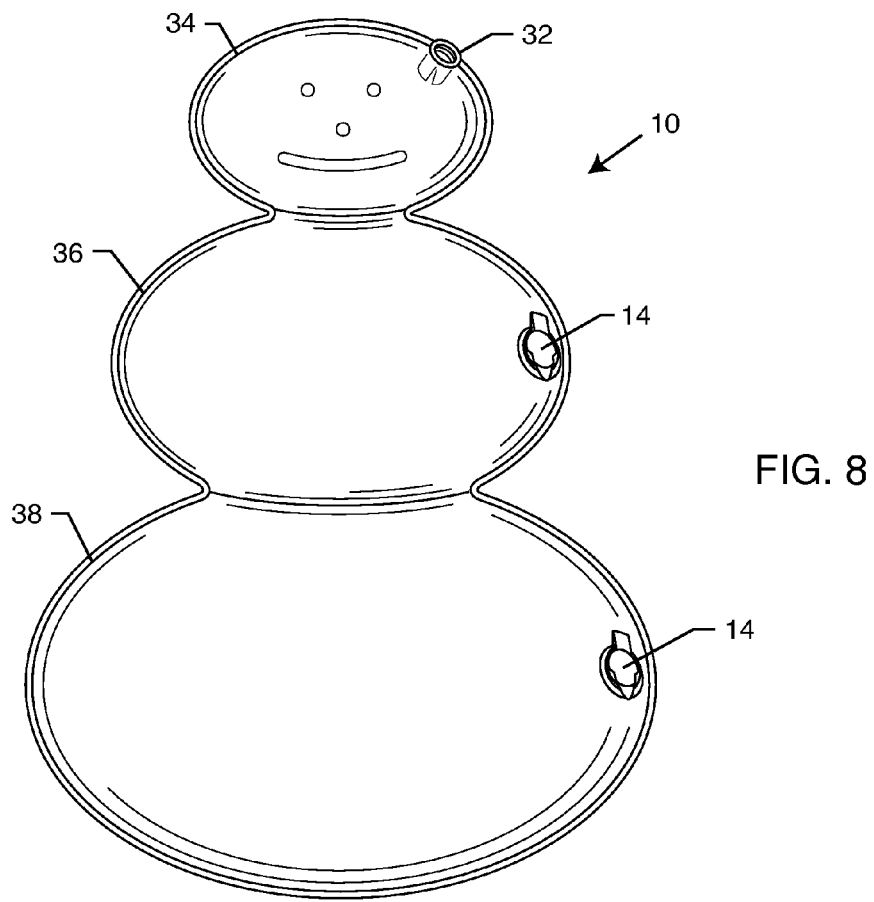
FIG. 8 is a perspective view of the dual-purpose package of the present invention embodied in a snowman.
Figure 9:
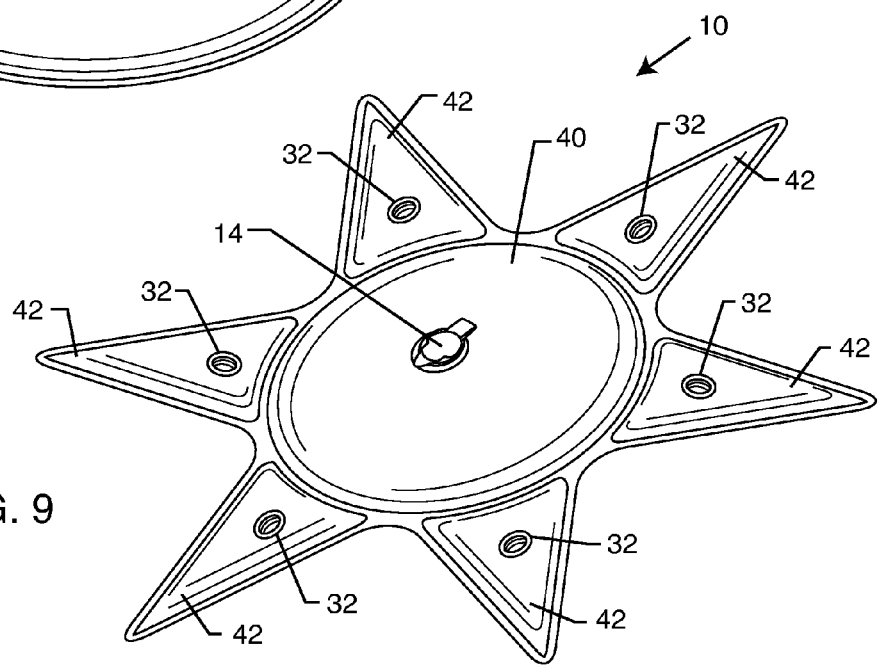
FIG. 9 is a perspective view of the dual-purpose package of the present invention embodied in a star configuration, including multiple squeak elements.

FIGS. 8 and 9 illustrate alternative embodiments of the dual-purpose package 10 of the present invention. In FIG. 8, the dual-purpose package 10 is embodied in a snowman having a top section 34, a middle section 36 and a bottom section 38. The top section 34 is preferably an air-filled section that functions as a squeak toy via the squeak element 32. The middle section 36 and the bottom section 38 preferably hold a liquid therein. Both the middle section 36 and the bottom section 38 include a pair of valves 14 for accessing the liquid stored therein. In a preferred embodiment, the middle section 36 is filled with a liquid that is different than the liquid that fills the bottom section 38. For example, the liquid stored in the middle section 36 may include conditioner while the liquid stored in the bottom section 38 may include shampoo. Each of the sections 34, 36, 38 may be attached to one another by heat or glue. Accordingly, the dual-purpose package 10 embodied in FIG. 8 may be used as a traditional squeak toy for a pet once all the liquid from the middle section 36 and the bottom section 38 has been dispensed. The valves 14 in the middle section 36 and the bottom section 38 may also include the squeak element 32 (not shown). Each of the squeak elements 32 integrated into the different sections 34, 36, 38 may be identical or different in that each squeak element 32 makes a different sound when activated by a pet.

FIG. 9 illustrates the dual-purpose package 10 embodied in a star configuration. In this embodiment, a main body 40 serves as the container for storing any one of a variety of liquids as previously described. The main body 40 includes the valve 14 for accessing the liquid stored within the main body 40. The valve 14 functions as previously described and may include the squeak element 32 shown in FIG. 6. Moreover, dual-purpose package 10 embodied in FIG. 9 includes a plurality of chambers 42 attached to the main body 40. The chambers 42 are preferably air-filled and affixed to the main body 40 by heat or glue. As shown, each chamber 42 includes the squeak element 32 that allows the dual-purpose package 10 to be used as a traditional squeak toy for a pet when the liquid contents stored within the main body 40 are completely dispensed therefrom. Each squeak element 32 may provide a different noise when activated by the pet. Alternatively, the squeak element 32 may be integrated into only one of the chambers 42.

Although several embodiments have been described in detail for purposes of illustration, various modifications may be made without departing from the scope and spirit of the invention.

What is claimed is:

1. A process for extending the utility of packaging for a pet-related product, the steps comprising:
    filling a flexible, non-toxic and bite resistant enclosure with a pet-related product through a valve;
    selectively dispensing the pet-related product from the enclosure;
    disposing a squeak element in the enclosure and coupled to the valve; and
    utilizing the enclosure as a pet chew toy.

2. The process of claim 1, wherein the pet-related product comprises a shampoo.

3. The process of claim 1, including the step of selectively refilling the enclosure.

4. The process of claim 3, including the step of refilling the enclosure with shampoo or another fluid.

5. The process of claim 1, including the step of dispensing the pet-related product from the enclosure through a selectively retractable valve.

6. The process of claim 5, including the step of concealing the valve within the enclosure after the dispensing step.

7. A process for extending the utility of packaging for a pet-related product, the steps comprising:
    filling a flexible, non-toxic and bite-resistant enclosure with a pet-related product, wherein the pet-related product comprises a shampoo;
    selectively dispensing the pet-related product from the enclosure through a valve; selectively removing the valve to expose a squeak element disposed in the enclosure; and
    utilizing the enclosure as a pet chew toy.

8. The process of claim 7, including the step of selectively refilling the enclosure with shampoo or another fluid.

9. The process of claim 7, including the step of concealing the valve within the enclosure after the dispensing step.

10. Dual purpose packaging for a pet-related product, comprising:
    a flexible, non-toxic and bite-resistant enclosure filled with the pet-related product;
    a squeak element located in the enclosure;
    means for selectively dispensing the pet-related product from the enclosure; and
    means for selectively refilling the enclosure, if desired;
    wherein the means for selectively dispensing and the means for selectively refilling are removable from the enclosure to expose the squeak element such that the enclosure may be reutilized as a pet chew toy once the pet-related product is substantially dispensed from the enclosure.

11. The packaging of claim 10, further comprising a retractable valve for dispensing the pet-related product from the enclosure.

12. The packaging of claim 10, wherein the pet-related product comprises shampoo.

13. The packaging of claim 10, including a second flexible, non-toxic and bite-resistant enclosure filled with a second pet-related product and attached to the first enclosure.

14. The packaging of claim 10, including a flexible, non-toxic and bite-resistant air-filled chamber attached to the enclosure.

15. The packaging of claim 14, wherein the chamber is selectively detachable from the enclosure.

16. A method of manufacturing dual-purpose packaging for a pet-related product, comprising the steps of:
    blow molding a flexible, non-toxic and bite-resistant enclosure;
    disposing a squeak element in the enclosure;
    integrating a valve into the enclosure;
    filling the enclosure with the pet-related product; and
    sealing the valve.

17. The method of claim 16, including the step of gluing an air-filled chamber having a squeak element therein to the enclosure.

* * * * *